(12) United States Patent
Isozaki et al.

(10) Patent No.: US 10,958,189 B2
(45) Date of Patent: Mar. 23, 2021

(54) POWER CONVERSION DEVICE

(71) Applicant: TOSHIBA MITSUBISHI-ELECTRIC INDUSTRIAL SYSTEMS CORPORATION, Chuo-ku (JP)

(72) Inventors: Jumpei Isozaki, Chuo-ku (JP); Taichiro Tsuchiya, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 6 days.

(21) Appl. No.: 16/605,844

(22) PCT Filed: Apr. 28, 2017

(86) PCT No.: PCT/JP2017/016982
§ 371 (c)(1),
(2) Date: Oct. 17, 2019

(87) PCT Pub. No.: WO2018/198331
PCT Pub. Date: Nov. 1, 2018

(65) Prior Publication Data
US 2021/0058006 A1   Feb. 25, 2021

(51) Int. Cl.
*H02M 1/36* (2007.01)
*H02M 7/483* (2007.01)
*H02M 1/00* (2006.01)

(52) U.S. Cl.
CPC ............ *H02M 7/483* (2013.01); *H02M 1/36* (2013.01); *H02M 2001/0006* (2013.01); *H02M 2007/4835* (2013.01)

(58) Field of Classification Search
None
See application file for complete search history.

(56) References Cited

U.S. PATENT DOCUMENTS

2012/0069612 A1*  3/2012  Hasler .................. H02J 3/26
                                                  363/71
2017/0104405 A1   4/2017  Pfof et al.
(Continued)

FOREIGN PATENT DOCUMENTS

CN          103326393 A     9/2013
WO     WO 2007/025828 A1    3/2007

OTHER PUBLICATIONS

International Search Report dated Jul. 25, 2017 in PCT/JP2017/016982 filed on Apr. 28, 2017.
(Continued)

*Primary Examiner* — Jeffrey A Gblende
(74) *Attorney, Agent, or Firm* — Oblon, McClelland, Maier & Neustadt, L.L.P.

(57) ABSTRACT

A control unit activates a power supply circuit when an input voltage becomes equal to or greater than a first threshold value. The control unit brings a switch into a conductive state when the input voltage becomes equal to or greater than a second threshold value and brings the switch into a non-conductive state when the input voltage becomes equal to or less than a third threshold value. The control unit deactivates the power supply circuit when the input voltage becomes equal to or less than a fourth threshold value. Based on the number of times that the input voltage becomes equal to or greater than the second threshold value after the power supply circuit is activated, the control unit further enables a latch function for holding the power supply circuit in a deactivated state.

4 Claims, 10 Drawing Sheets

(56) References Cited

U.S. PATENT DOCUMENTS

2018/0138807 A1    5/2018  Pfof et al.
2018/0254699 A1*  9/2018  Akagi .................. H02M 3/155
2019/0229610 A1    7/2019  Pfof et al.
2019/0341838 A1* 11/2019  As ........................ H02M 7/162

OTHER PUBLICATIONS

Extended European Search Report dated Oct. 28, 2020 in European Patent Application No. 17907461.2, citing documents AA and AO therein, 8 pages.

* cited by examiner

FIG.7

| INPUT S | INPUT R | OUTPUT Q | STATE |
|---|---|---|---|
| H | L | H | SET STATE |
| L | H | L | RESET STATE |
| L | L | MAINTAIN | MAINTAIN |

| Vin | FF CIRCUIT 556 | | | FF CIRCUIT 557 | | | LOGIC CIRCUIT 558 | POWER SUPPLY CIRCUIT 56 |
|---|---|---|---|---|---|---|---|---|
| | INPUT S = OUTPUT OF COMPARISON CIRCUIT 551 | INPUT R= OUTPUT OF COMPARISON CIRCUIT 552 | OUTPUT Q | INPUT S = OUTPUT OF COMPARISON CIRCUIT 551 | INPUT R = FIXED AT L | OUTPUT Q | | |
| Vin ≤ V2 | L | H | L | L | L | MAINTAIN | L | DEACTIVATE |
| V2 < Vin < V3 | L | L | MAINTAIN | L | L | MAINTAIN | MAINTAIN | MAINTAIN |
| V3 ≤ Vin | H | L | H | H | L | H | H | ACTIVATE |

(B)

| Vin | INPUT R OF FF CIRCUIT 557 = OUTPUT OF COMPARISON CIRCUIT 552 | LOGIC CIRCUIT 558 | POWER SUPPLY CIRCUIT 56 |
|---|---|---|---|
| V1 < Vin ≤ V2 | H | L | DEACTIVATE |
| V2 < Vin | L | MAINTAIN | MAINTAIN |

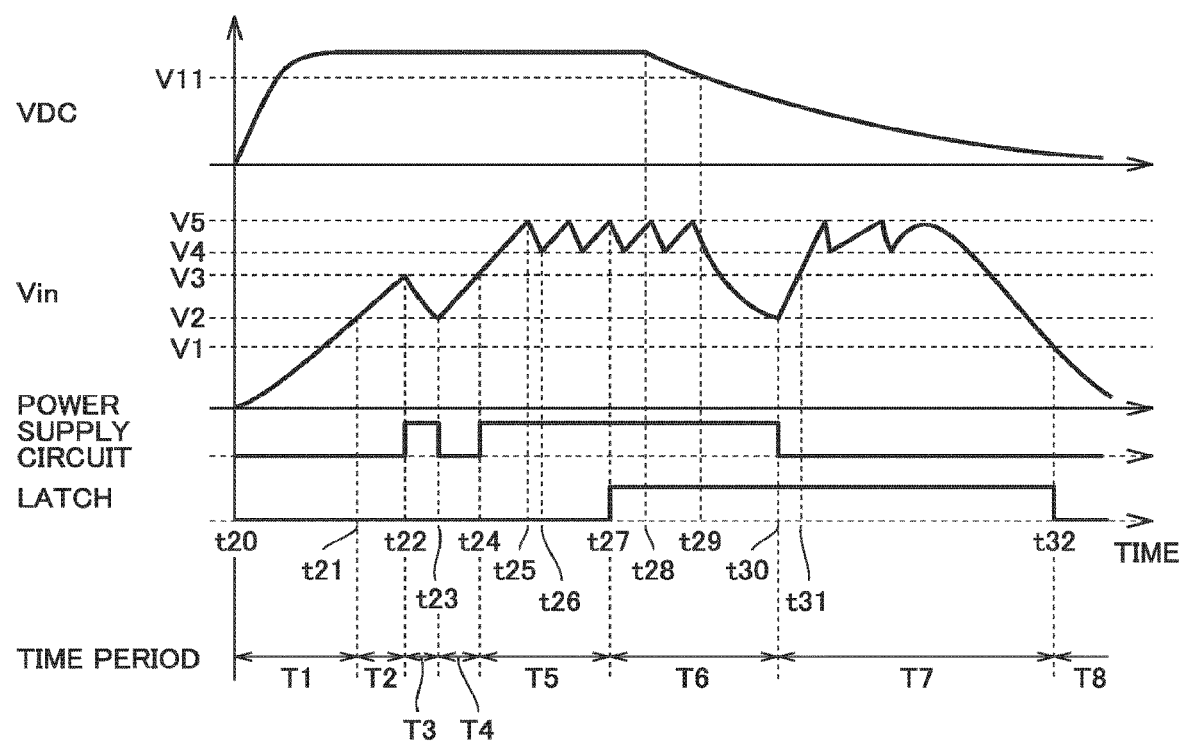

POWER CONVERSION DEVICE

TECHNICAL FIELD

The present invention relates to a power conversion device, and more particularly to a power conversion device configured with a series connection of at least one or more unit converters in a main circuit power supply system.

BACKGROUND ART

In recent years, it has been considered to apply a modular multilevel converter (MMC) to a self-excited reactive power compensation apparatus such as a static synchronous compensator (STATCOM), a direct-current (DC) power transmission system such as a back to back (BTB) system, a motor drive inverter, and the like (for example, see WO2007/025828 (PTL 1)).

The MMC is configured with a plurality of unit converters connected in series. A unit converter includes a main circuit that includes a switching element and a DC capacitor. The unit converter causes the switching element to perform a switching operation to thereby output the voltage across the DC capacitor to an output terminal. As a switching element, a semiconductor switching element such as an insulated gate bipolar transistor (IGBT) capable of controlling conduction/non-conduction is generally used.

CITATION LIST

Patent Literature

PTL 1: WO 2007/025828

SUMMARY OF INVENTION

Technical Problem

Unit converters forming an MMC each are provided with a main circuit and, additionally, a control circuit for controlling conduction/non-conduction of a switching element on the main circuit in cooperation with a high-order controller that controls the entire MMC. There is a known configuration called a main circuit power supply system in which each of the unit converters in the MMC is provided with a power supply for supplying a power supply voltage to a control circuit based on the electric power generated in the main circuit. Generally, in the MMC configured in this way, the DC voltage across the DC capacitor in the main circuit is stepped down by a current limiting resistance, thereby generating an input voltage to a power supply. The electric power appropriate to this input voltage is temporarily stored in the capacitor provided inside the power supply. The power supply supplies a power supply voltage, which is obtained by further stepping down this input voltage, to a control circuit.

Specifically, when the MMC is activated, electric power is supplied to the DC capacitor in the main circuit in each of the unit converters from outside the MMC. When the input voltage into the power supply becomes equal to or greater than the first voltage due to an increase in the DC voltage across the DC capacitor in the main circuit, supply of the power supply voltage from the power supply to the control circuit is started to thereby activate the control circuit.

On the other hand, while the MMC is deactivated, supply of the electric power from the outside of the MMC is stopped in each of the unit converters. Thus, the DC voltage across the DC capacitor decreases. When the input voltage becomes equal to or less than the second voltage that is less than the first voltage, the supply of the power supply voltage from the power supply to the control circuit is stopped, and then, the control circuit is deactivated.

In this case, when the power supply is deactivated as described above, supply of the power supply voltage to the control circuit from the power supply is stopped, so that consumption of the electric power temporarily stored in the power supply is also stopped. As a result, the input voltage increases again by the electric power supplied from the DC capacitor and exceeds the first voltage. Then, the control circuit is reactivated after the MMC is deactivated. Thereby, the operation of each unit converter becomes unstable, which leads to a concern that a malfunction may occur in the MMC.

The present invention has been made to solve the above-described problems. An object of the present invention is to prevent a malfunction from occurring in a power conversion device after the power conversion device is deactivated, the power conversion device being configured with a series connection of at least one or more unit converters in a main circuit power supply system.

Solution to Problem

According to an aspect of the present invention, a power conversion device includes a power converter and a controller. The power converter includes an arm that is configured with a series connection of at least one or more unit converters. The controller is configured to control the power converter. The at least one or more unit converters each include a main circuit, a control circuit, and a power supply. The main circuit includes a plurality of switching elements and a capacitor. The main circuit is configured to control the plurality of switching elements to convert a voltage across the capacitor into an alternating-current (AC) voltage. The control circuit is configured to control the plurality of switching elements according to a control signal received from the controller. The power supply is configured to step down the voltage across the capacitor and supply a power supply voltage to the control circuit. The power supply includes a first input terminal, a second input terminal, a voltage sensor, a switch, a resistance, a power supply circuit, and a control unit. The voltage sensor is configured to detect an input voltage supplied between the first input terminal and the second input terminal from the capacitor. The switch and the resistance are electrically connected in series between the first input terminal and the second input terminal. The power supply circuit is electrically connected between the first input terminal and the second input terminal, and configured to convert the input voltage into the power supply voltage. The control unit is configured to activate the power supply circuit when the input voltage becomes equal to or greater than a first threshold value. The control unit is configured to bring the switch into a conductive state when the input voltage becomes equal to or greater than a second threshold value that is greater than the first threshold value. The control unit is configured to bring the switch into a non-conductive state when the input voltage becomes equal to or less than a third threshold value that is greater than the first threshold value and less than the second threshold value in a case where the switch is in a conductive state. The control unit is configured to deactivate the power supply circuit when the input voltage becomes equal to or less than a fourth threshold value that is less than the first threshold value. The control unit is further configured to enable a latch function based on a number of times that the input voltage becomes equal to or greater than the second threshold value after the power supply circuit is activated, the latch function being for holding the power supply circuit in a deactivated state.

Advantageous Effects of Invention

According to the present invention, it becomes possible to prevent a malfunction from occurring in a power conversion device after the power conversion device is deactivated, the power conversion device being configured with a series connection of at least one or more unit converters in a main circuit power supply system.

BRIEF DESCRIPTION OF DRAWINGS

FIG. 7 is a table showing the operation of an FF circuit shown in FIG. 6.

FIG. 8 is a table showing the operation of a power supply shown in FIG. 6.

FIG. 9 is a diagram showing control of activation and deactivation of a power supply circuit by the power supply shown in FIG. 6.

DESCRIPTION OF EMBODIMENTS

Figure 1:
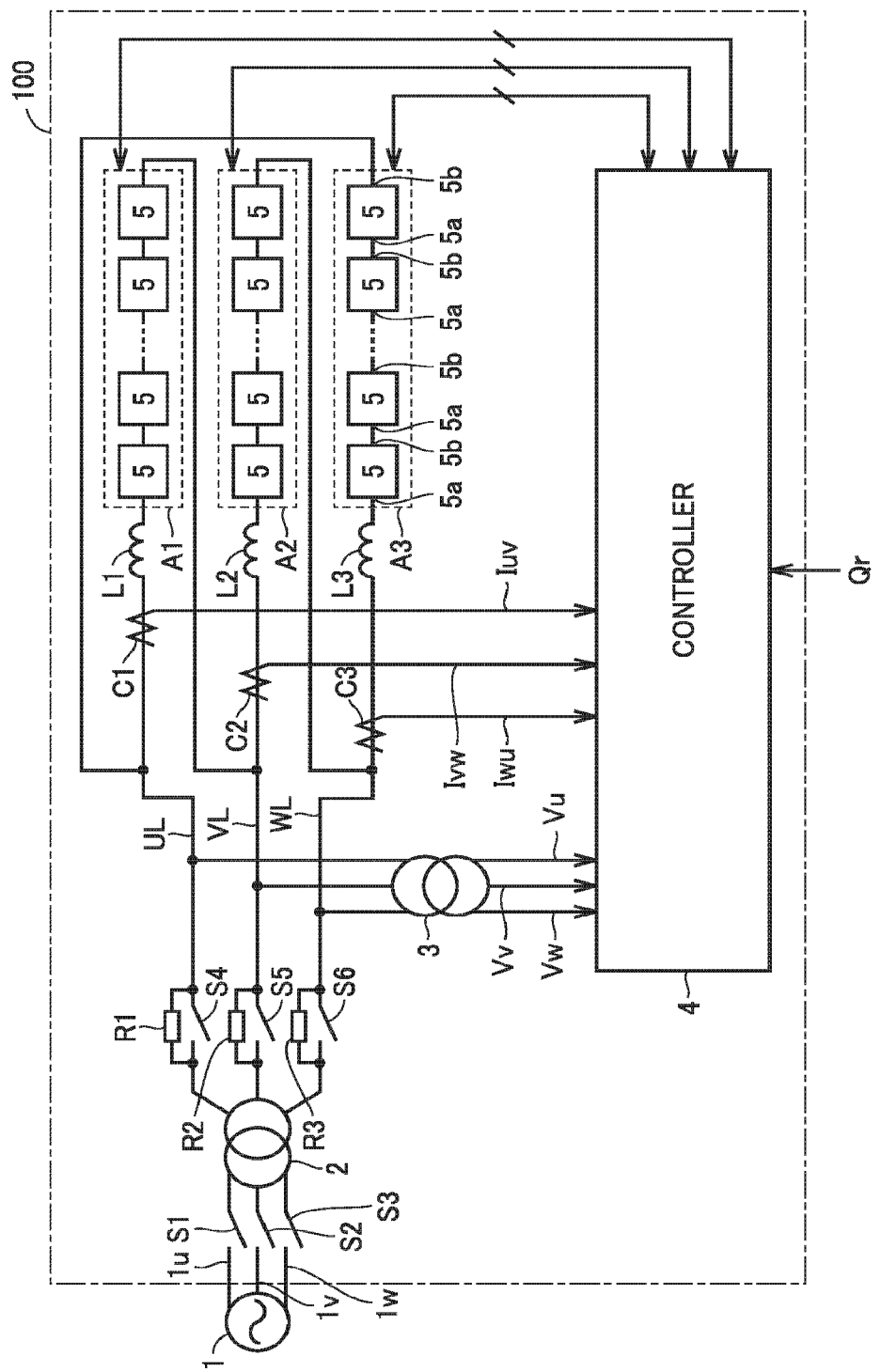
FIG. 1 is a configuration diagram of an example of an MMC that is configured of unit converters in a main circuit power supply system.

The embodiments of the present invention will be hereinafter described in detail with reference to the accompanying drawings, in which the same or corresponding components will be designated by the same reference characters, and description thereof will not be repeated.

FIG. 1 is a configuration diagram of an example of an MMC configured of unit converters in a main circuit power supply system. This power conversion device 100 is used as a reactive power compensation apparatus configured to compensate for reactive power in an electric power system 1. Referring to FIG. 1, power conversion device 100 includes: arms A1 to A3 each are configured with a series connection of at least one or more unit converters 5; and a controller 4 configured to control at least one or more unit converters 5. More specifically, power conversion device 100 includes switches S1 to S6, transformers 2 and 3, current limiting resistors R1 to R3, AC lines UL, VL, and WL, current transformers C1 to C3, reactors L1 to L3, arms A1 to A3, and a controller 4.

Switches S1, S2 and S3 each have: one terminal connected to a corresponding one of power transmission lines 1u, 1v, and 1w of three phases in electric power system 1; and the other terminal connected to a corresponding one of three primary windings of transformer 2. Switches S1 to S3 each are in a conductive state under a normal condition, and brought into a non-conductive state, for example, when power conversion device 100 undergoes maintenance. Transformer 2 includes three primary windings and three secondary windings, and transmits and receives a three-phase AC power.

Current limiting resistors R1, R2 and R3 each have: one terminal connected to a corresponding one of three secondary windings of transformer 2; and the other terminal connected to a corresponding one of AC lines UL, VL, and WL. Current limiting resistors R1 to R3 each limit a current flowing through a corresponding one of arms A1 to A3 from electric power system 1 when power conversion device 100 is activated.

Switches S4, S5 and S6 are connected in parallel to current limiting resistors R1, R2 and R3, respectively. Switches S4 to S6 each are brought into a conductive state after the current flowing through a corresponding one of arms A1 to A3 is stabilized when power conversion device 100 is activated. Transformer 3 outputs three-phase AC voltages Vu, Vv and Vw of values appropriate to the AC voltages on AC lines UL, VL, and WL, respectively, to controller 4.

Reactor L1 and arm A1 are connected in series between AC line UL and AC line VL. Reactor L2 and arm A2 are connected in series between AC line VL and AC line WL. Reactor L3 and arm A3 are connected in series between AC line WL and AC line UL. In other words, arms A1 to A3 are delta-connected. Arms A1 to A3 are controlled by controller 4 to generate three-phase AC power.

Each of arms A1 to A3 includes a plurality of unit converters 5 that are cascade-connected. Each of the plurality of unit converters 5 generates AC power according to the control signal from controller 4.

A first terminal 5a of unit converter 5 in the first stage of arm A1 is connected to one terminal of reactor L1. In arm A1, a second terminal Sb of each of unit converters 5 other than unit converter 5 in the last stage is connected to a corresponding one of first terminals 5a of unit converters 5 in the subsequent stages. Second terminal 5b of unit converter 5 in the last stage in arm A1 is connected to one terminal of reactor L2.

A first terminal 5a of unit converter 5 in the first stage in arm A2 is connected to one terminal of reactor L2. In arm A2, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A2 is connected to one terminal of reactor L3.

A first terminal 5a of unit converter 5 in the first stage in arm A3 is connected to one terminal of reactor L3. In arm A3, a second terminal 5b of each of unit converters 5 other than unit converter 5 in the last stage is connected to a corresponding one of first terminals 5a of unit converters 5 in the subsequent stages. Second terminal 5b of unit converter 5 in the last stage in arm A3 is connected to one terminal of reactor L1.

Reactors L1, L2 and L3 suppress the circulating currents flowing through arms A1, A2 and A3, respectively. Reactors L1, L2 and L3 may be provided separately from arms A1, A2 and A3, respectively, or may be inductance components of arms A1, A2 and A3, respectively. Current transformers C1, C2 and C3 detect AC currents Iuv, Ivw and Iwu flowing through arms A1, A2 and A3, respectively, and output the detected currents to controller 4.

Controller 4 receives inputs such as a reactive power command value Qr, three-phase AC voltages Vu, Vv and Vw, AC currents Iuv, Ivw and Iwu, and a DC voltage VDC (which will be described later), and outputs a control signal GC, a control signal GB, a conduction command Son and the like (each of which will be described later), thereby controlling each of three arms A1 to A3 (that is, each of a plurality of unit converters 5). Reactive power command value Qr is provided, for example, from a center control unit (not shown) in electric power system 1. Power conversion device 100 supplies reactive power of the value appropriate to reactive power command value Qr to electric power system 1.

Figure 2:
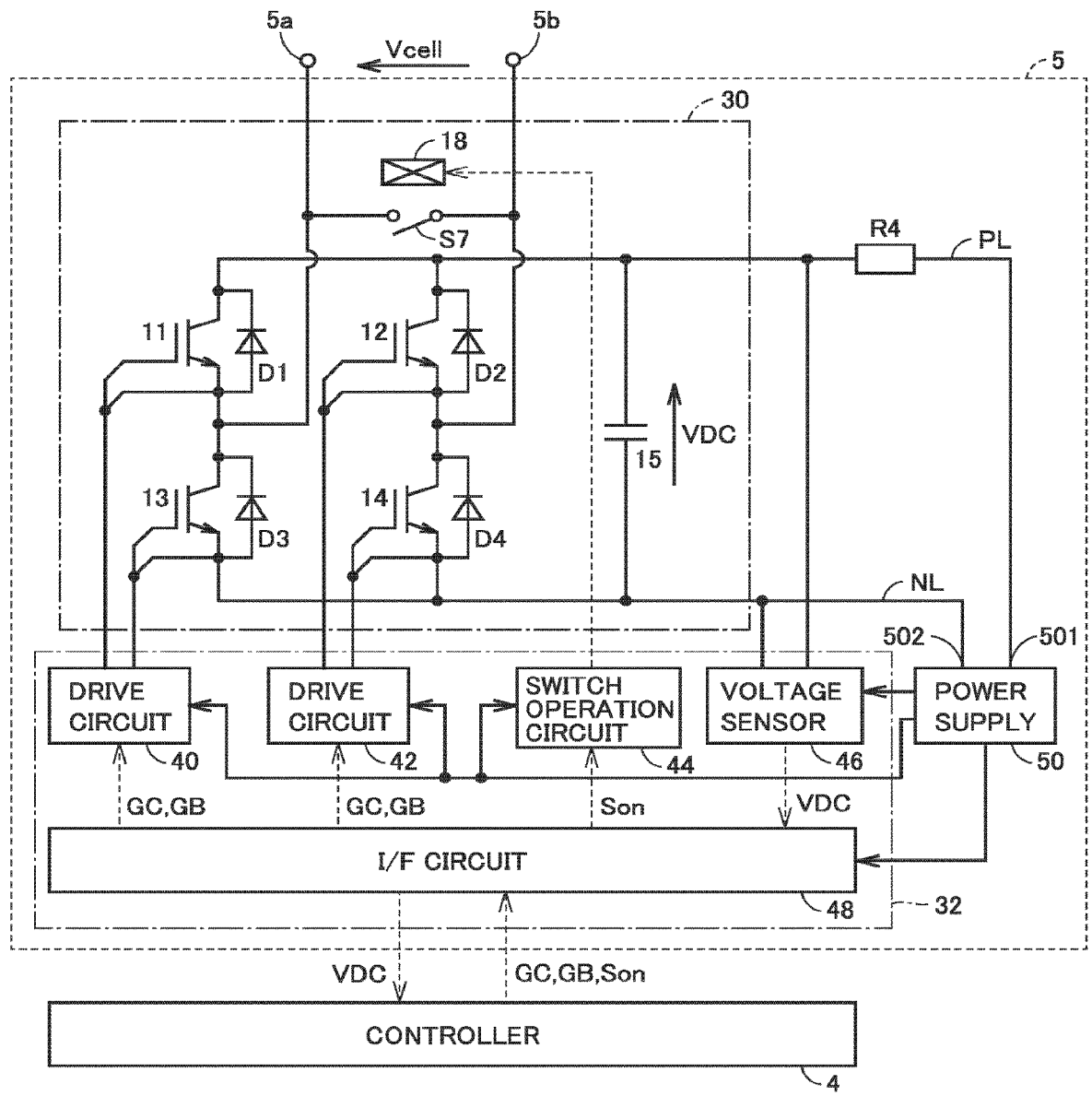
FIG. 2 is a circuit block diagram showing the configuration of one of the unit converters shown in FIG. 1.

FIG. 2 is a circuit block diagram showing the configuration of one of unit converters 5 shown in FIG. 1. Referring to FIG. 2, unit converter 5 includes a main circuit 30, a control circuit 32, a resistance R4, and a power supply 50.

Main circuit 30 is configured of a full bridge circuit including a capacitor. Specifically, main circuit 30 has a first terminal 5a and a second terminal 5b. Main circuit 30 includes switching elements 11 to 14, diodes D1 to D4, and a capacitor 15. Main circuit 30 controls conduction/non-conduction of each of switching elements 11 to 14, to output a voltage pulse having an amplitude appropriate to the voltage across capacitor 15 between first terminal 5a and second terminal 5b, thereby converting the DC power into AC power.

Switching elements 11 to 14 each are a self-arc-extinguishing-type power semiconductor element and formed of an IGBT, for example. Switching elements 11 and 13 are connected in series between a DC line PL and a DC line NL. Switching elements 12 and 14 are connected in series between DC line PL and DC line NL. The collectors of switching elements 11 and 12 are connected to DC line PL while the emitters of switching elements 13 and 14 are connected to DC line NL. The connection point between the emitter of switching element 11 and the collector of switching element 13 is connected to first terminal 5a. The connection point between the emitter of switching element 12 and the collector of switching element 14 is connected to second terminal 5b.

Diodes D1, D2, D3, and D4 are connected in anti-parallel with switching elements 11, 12, 13, and 14, respectively. Capacitor 15 is connected between DC line PL and DC line NL and stores DC power.

In unit converter 5, conduction/non-conduction of each of switching elements 11 to 14 is controlled by control circuit 32. Switching elements 11 and 13 are brought into a conductive state in a manner complementary to each other. Switching elements 12 and 14 are brought into a conductive state in a manner complementary to each other. As shown in FIG. 2, assuming that the voltage to first terminal 5a with respect to second terminal 5b is defined as a cell voltage Vcell, cell voltage Vcell is controlled by conduction/non-conduction of each of switching elements 11 to 14.

Specifically, when each of switching elements 11 and 14 is in a conductive state and when each of switching elements 12 and 13 is in a non-conductive state, cell voltage Vcell is approximately equal to DC voltage VDC on capacitor 15. When each of switching elements 11 and 12 is in a conductive state and when each of switching elements 13 and 14 is in a non-conductive state, cell voltage Vcell is approximately zero. When each of switching elements 11 and 12 is in a non-conductive state and when each of switching elements 13 and 14 is in a conductive state, cell voltage Vcell is approximately zero. When each of switching elements 11 and 14 is in a non-conductive state and when each of switching elements 12 and 13 is in a conductive state, cell voltage Vcell is approximately equal to the voltage that is obtained by inverting the polarity of DC voltage VDC on capacitor 15.

The entire voltage on arms A1 to A3 is represented by the sum of cell voltages Vcell on unit converters 5 included in each of corresponding arms A1 to A3. Accordingly, the entire voltage on arms A1 to A3 can be controlled by conduction/non-conduction of each of switching elements 11 to 14 forming each of unit converters 5.

Main circuit 30 further includes a switch S7. Switch S7 is connected between first terminal 5a and second terminal 5b. Switch S7 is closed according to conduction command Son from control circuit 32 so as to be capable of short-circuiting first terminal 5a and second terminal 5b.

Control circuit 32 includes drive circuits 40 and 42, a switch operation circuit 44, a voltage sensor 46, and an interface (I/F) circuit 48. Control circuit 32 is configured to control conduction/non-conduction of each of switching elements 11 to 14 according to the control signal received from controller 4.

I/F circuit 48 communicates with controller 4 by wire (not shown) or wirelessly. From controller 4, I/F circuit 48 receives control signal GC for controlling the full bridge circuit in main circuit 30. From controller 4, I/F circuit 48 further receives control signal GB for bringing each of switching elements 11 to 14 forming the full bridge circuit into a non-conductive state. I/F circuit 48 outputs the received control signal GC and control signal GB to each of drive circuits 40 and 42.

In response to control signal GC, drive circuit 40 controls conduction/non-conduction of each of switching elements 11 and 13. Alternatively, in response to control signal GB, drive circuit 40 brings each of switching elements 11 and 13 into the state where each of switching elements 11 and 13 is fixed in a non-conductive state (deactivated state).

In response to control signal GC, drive circuit 42 controls conduction/non-conduction of each of switching elements 12 and 14. Alternatively, in response to control signal GB, drive circuit 42 brings each of switching elements 12 and 14 into the state where each of switching elements 12 and 14 is fixed in a non-conductive state.

Switch operation circuit 44 serves as a circuit for operating switch S7. Switch operation circuit 44 controls power conduction to exciting coil 18 according to the command from controller 4. During the normal operation, current supply to exciting coil 18 is stopped, so that switch S7 is brought into a non-conductive state. On the other hand, when controller 4 detects an abnormality such as a short-circuit fault in the switching element in one unit converter 5 of the plurality of unit converters 5, controller 4 outputs conduction command Son for switch S7 to this one unit converter 5 having such a fault. In unit converter 5 having a fault, I/F circuit 48 receives conduction command Son and outputs the received conduction command Son to switch operation circuit 44. In response to conduction command Son, switch operation circuit 44 supplies a current to exciting coil 18, thereby bringing switch S7 into a conductive state. Thereby, the output of unit converter 5 having a fault is short-circuited.

Voltage sensor 46 detects DC voltage VDC between the terminals of capacitor 15 and outputs the detection value to I/F circuit 48. I/F circuit 48 transmits the detection value of DC voltage VDC to controller 4. Resistance R4 serves as a current limiting resistance for stepping down DC voltage VDC on capacitor 15.

Power supply 50 is electrically connected in parallel to capacitor 15. Power supply 50 includes input terminals 501 and 502. Input terminal 501 is connected to DC line PL. Input terminal 502 is connected to DC line NL. By stepping down DC voltage VDC on capacitor 15 by resistance R4, power supply 50 generates a power supply voltage that is to be supplied to control circuit 32. In other words, each unit converter 5 forms a cell of a self-contained type, which is capable of supplying electric power from main circuit 30 to control circuit 32. Input terminals 501 and 502 correspond to "the first input terminal and the second input terminal", respectively.

Then, the summary of the normal operation of power conversion device 100 will be described.

Based on AC currents Iuv, Ivw, and Iwu from current transformers C1, C2 and C3, respectively, controller 4 calculates three-phase AC currents Iu, Iv, and Iw of the levels in accordance with the AC currents flowing through AC lines UL, VL, and WL, respectively. It is to be noted that Iu=Iuv−Iwu, Iv=Ivw−Iuv, and Iw=Iwu−Ivw.

Controller 4 calculates reactive power Q0 based on three-phase AC voltages Vu, Vv, and Vw from transformer 3 and three-phase AC currents Iu, Iv, and Iw from a computing unit 31. Controller 4 calculates a deviation ΔQ between reactive power command value Qr and reactive power Q0 (ΔQ=Qr−Q0).

Based on AC currents Iuv, Ivw and Iwu from current transformers C1, C2 and

C3, respectively, and three-phase AC voltages Vu, Vv and Vw from transformer 3, and the like, controller 4 generates 60 voltage command values VDCr corresponding to their respective unit converters 5.

Controller 4 calculates a deviation ΔVDC between voltage command value VDCr and DC voltage VDC. Controller 4 performs the control operation for setting voltage deviation ΔVDC to be zero and setting reactive power deviation ΔQ to be zero, thereby generating three-phase AC voltage command values Vuvr, Vvwr, and Vwur.

In other words, controller 4 perform active current control for each unit converter 5 such that voltage deviation ΔVDC becomes zero and also performs reactive current control for each unit converter 5 such that reactive power deviation ΔQ becomes zero.

Based on three-phase AC voltage command values Vuvr, Vvwr and Vwur, each of unit converters 5 in each of arms A1 to A3 is operated, and thus, DC voltage VDC becomes equal to voltage command value VDCr while reactive power Q0 becomes equal to reactive power command value Qr. Specifically, for example, according to pulse width modulation (PWM) control, controller 4 generates control signal GC for causing the power conversion device to output the voltage corresponding to each of three-phase AC voltage command values Vuvr, Vvwr, and Vwur. Controller 4 outputs control signal GC to control circuit 32 of each unit converter 5 in each of arms A1 to A3. According to control signal GC, each control circuit 32 brings each of switching elements 11 to 14 into a conductive state at a prescribed timing, thereby converting the DC voltage into an AC voltage.

Then, the configuration example of power supply 50 shown in FIG. 2 will be hereinafter described with reference to FIGS. 3 to 10. Among the first to third configuration examples that will be described below, each of the first and second configuration examples constitutes a comparative example while the third configuration example constitutes an example of the present invention.

Figure 3:
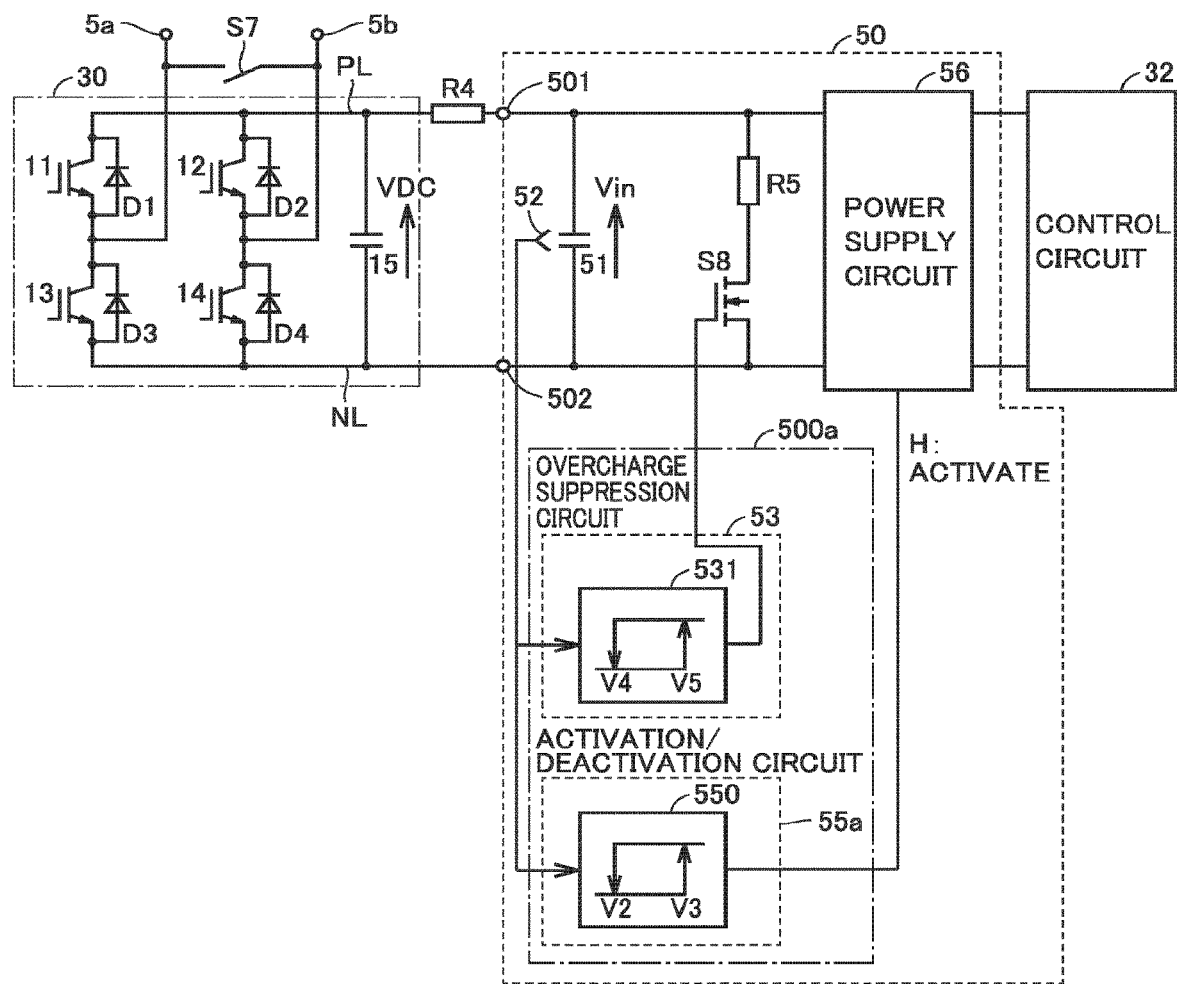
FIG. 3 is a circuit block diagram of a power supply according to the first configuration example.

FIG. 3 is a circuit block diagram of power supply 50 according to the first configuration example. Referring to FIG. 3, power supply 50 includes a capacitor 51, a voltage sensor 52, a transistor S8, a resistance R5, a control unit 500a, and a power supply circuit 56.

Capacitor 51 is connected between an input terminal 501 and an input terminal 502. Also, capacitor 51 is configured to generate an input voltage Vin by electric power supplied through resistance R4 from capacitor 15.

Voltage sensor 52 detects input voltage Vin (the voltage between the terminals of capacitor 51), and outputs the detection value to control unit 500a.

Transistor S8 and resistance R5 are electrically connected in series between input terminal 501 and input terminal 502. Conduction/non-conduction of transistor S8 is controlled by control unit 500a. When transistor S8 is in a conductive state, a discharge current from capacitor 51 flows through resistance R5, and input voltage Vin on capacitor 51 decreases. In other words, resistance R5 serves as an overcharge suppression resistance for capacitor 51. Transistor S8 corresponds to one example of the "switch" of the present invention. Any other type of switch such as a relay may be applicable as long as conduction/non-conduction can be controlled by control unit 500a.

Based on the detection value of voltage sensor 52, control unit 500a controls conduction/non-conduction of transistor S8 and activation/deactivation of power supply circuit 56. Control unit 500a includes an overcharge suppression circuit 53 and an activation/deactivation circuit 55a.

Based on input voltage Vin, overcharge suppression circuit 53 brings transistor S8 into conduction/non-conduction, thereby suppressing overcharging of capacitor 51. Overcharge suppression circuit 53 includes a comparison circuit 531. The signal output from comparison circuit 531 to transistor S8 shifts from an L (logic low) level to an H (logic high) level when the detection value of input voltage Vin becomes equal to or greater than a threshold value V5 while input voltage Vin increases. On the other hand, the signal output from comparison circuit 531 to transistor S8 shifts from an H level to an L level when the detection value of input voltage Vin becomes equal to or less than a threshold value V4 while input voltage Vin decreases. Transistor S8 is configured to be brought into a conductive state when the signal output from comparison circuit 531 is at an H level and to be brought into a non-conductive state when the signal output from comparison circuit 531 is at an L level. Threshold values V5 and V4 correspond to the "second threshold value" and the "third threshold value", respectively, of the present invention, and satisfy the relation of V5>V4.

Based on the detection value of input voltage Vin, activation/deactivation circuit 55a controls activation/deactivation of power supply circuit 56. Activation/deactivation circuit 55a includes a comparison circuit 550.

The signal output from comparison circuit 550 to power supply circuit 56 shifts from an L level to an H level when the detection value of input voltage Vin becomes equal to or greater than a threshold value V3 while input voltage Vin increases. On the other hand, the signal output from comparison circuit 550 to power supply circuit 56 shifts from an H level to an L level when the detection value of input voltage Vin becomes equal to or less than a threshold value V2 while input voltage Vin decreases. Threshold values V3 and V2 correspond to the "first threshold value" and the "fourth threshold value", respectively, of the present invention, and satisfy the relation of V4>V3>V2.

Power supply circuit 56 is activated when the output signal of comparison circuit 550 shifts from an L level to an H level, and supplies a power supply voltage to control circuit 32. Thereby, control circuit 32 is activated. On the other hand, power supply circuit 56 is deactivated when the output signal of comparison circuit 550 shifts from an H level to an L level. Accordingly, supply of the power supply voltage from power supply circuit 56 to control circuit 32 is stopped, and thus, control circuit 32 is deactivated.

Figure 4:
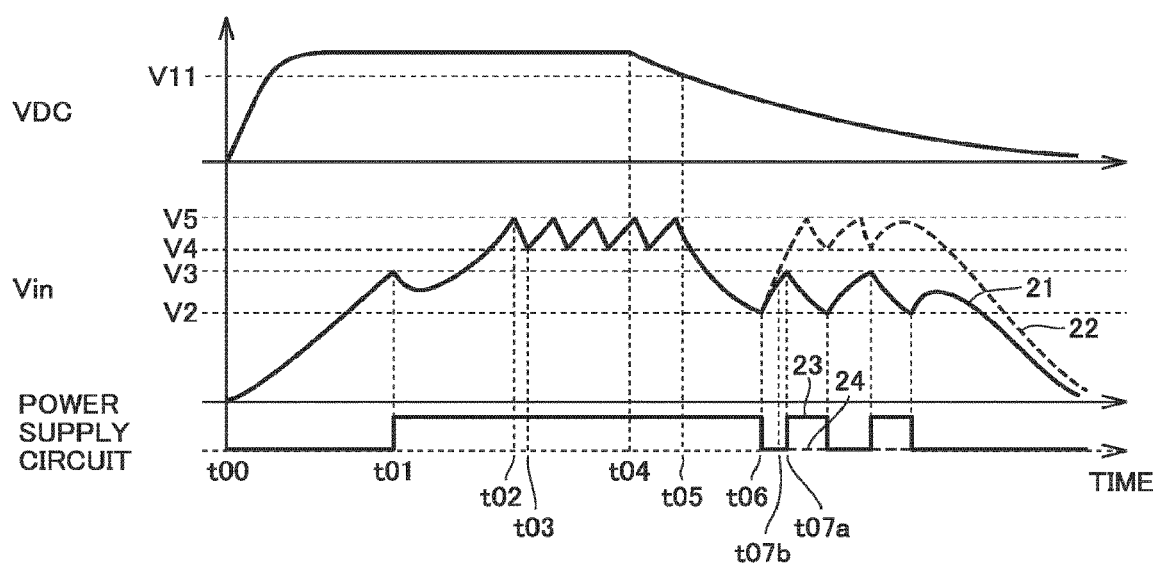
FIG. 4 is a diagram showing control of activation and deactivation of a power supply circuit by the power supply shown in FIG. 3.

Then, referring to FIG. 4, the operation of power supply 50 according to the first configuration example shown in FIG. 3 will be described. FIG. 4 is a diagram showing control of activation and deactivation of power supply circuit 56 by power supply 50 shown in FIG. 3.

At time t00, switches S1 to S3 each are brought into a conductive state and power conversion device 100 is activated. In each unit converter 5, initial charging of capacitor 15 is performed, and DC voltage VDC on capacitor 15 increases. Voltage Vin between the terminals of capacitor 51 (input voltage Vin) also increases accordingly.

When input voltage Vin becomes equal to or greater than threshold value V3 at time t01, power supply circuit 56 is activated. Specifically, when the detection value of input voltage Vin by voltage sensor 52 becomes equal to or greater than threshold value V3, the signal at an H level is output from comparison circuit 550 of activation/deactivation circuit 55a to power supply circuit 56, and thus, power supply circuit 56 is activated. Thereby, a power supply voltage is supplied to control circuit 32, and then, control circuit 32 is activated.

During t01<t<t02, the electric power in capacitor 51 is partially consumed for operations of power supply circuit 56 and control circuit 32 while capacitor 51 also simultaneously receives supply of electric power from capacitor 15. Therefore, under a normal condition, input voltage Vin may temporarily decrease due to the start-up currents of power supply circuit 56 and control circuit 32, but eventually increases.

When input voltage Vin becomes equal to or greater than threshold value V5 at time t02, comparison circuit 531 of overcharge suppression circuit 53 outputs the signal at an H level to transistor S8, to bring transistor S8 into a conductive state. Thus, the discharge current from capacitor 51 flows through resistance R5, and the electric power of capacitor 51 is consumed, so that input voltage Vin on capacitor 51 starts to decrease.

When input voltage Vin becomes equal to or less than threshold value V4 at time t03, comparison circuit 531 of overcharge suppression circuit 53 outputs the signal at an L level to transistor S8, to bring transistor S8 into a non-conductive state. Thereby, the discharge current from capacitor 51 does not flow through resistance R5, and thus, resistance R5 stops consumption of the electric power of capacitor 51. Accordingly, input voltage Vin on capacitor 51 starts to rise by power supply from capacitor 15.

Also after this, while power conversion device 100 is operated normally, input voltage Vin is maintained between threshold values V4 and V5 under control by overcharge suppression circuit 53 as described above.

When power conversion device 100 is deactivated by bringing each of switches S1 to S3 into a non-conductive state at time t04, self-discharge of capacitor 15 using a discharge resistance (not shown) is started. Thereby, DC voltage VDC on capacitor 15 starts to decrease.

When DC voltage VDC becomes equal to or less than a prescribed threshold value V11 at time t05, then, in capacitor 51, the electric power consumed by power supply circuit 56 becomes greater than the electric power supplied from capacitor 15. Thereby, input voltage Vin stops increasing but only decreases.

When input voltage Vin becomes equal to or less than threshold value V2 at time t06, power supply circuit 56 is deactivated. Thereby, power consumption in capacitor 51 is suppressed, so that input voltage Vin starts to increase. Specifically, when the detection value of input voltage Vin by voltage sensor 52 becomes equal to or less than threshold value V2, the signal at an L level is output from comparison circuit 550 of activation/deactivation circuit 55a to power supply circuit 56. Thus, power supply circuit 56 is deactivated.

At and after time t06, a waveform 21 and a waveform 23 show a change in input voltage Vin in power supply 50 and the operation state of power supply circuit 56, respectively, according to the first configuration example.

When input voltage Vin becomes equal to or greater than threshold value V3 at time t07a, power supply circuit 56 that has been once deactivated by activation/deactivation circuit 55a is reactivated by control similar to control at time t01. By reactivation of power supply circuit 56, the electric power is again consumed in capacitor 51, so that input voltage Vin starts to decrease.

Then, until DC voltage VDC on capacitor 15 sufficiently decreases and the power supply from capacitor 15 to capacitor 51 sufficiently decreases, input voltage Vin shifts between threshold values V2 and V3. Power supply circuit 56 is activated when input voltage Vin becomes equal to or greater than threshold value V3. Power supply circuit 56 is deactivated when input voltage Vin becomes equal to or less than threshold value V2.

In this way, while power conversion device 100 is deactivated, power supply circuit 56 that has been once deactivated is reactivated, and after that, repeatedly activated and deactivated. When such an unstable operation of power supply circuit 56 destabilizes the operation of control circuit 32, the operation of main circuit 30 is also destabilized. As a result, a malfunction may occur in power conversion device 100 after it is deactivated.

In FIG. 4, a waveform 22 and a waveform 24 show an ideal change in input voltage Vin on power supply 50 and an ideal operation state of power supply circuit 56, respectively. Ideally, as shown by waveform 24, it is preferable to prevent power supply circuit 56 from being reactivated even when input voltage Vin becomes equal to or greater than threshold value V3 at time t07b after power supply circuit 56 is once deactivated at time t06.

In order to prevent reactivation of power supply circuit 56, it is conceivable to hold (latch) the deactivated state of power supply circuit 56 after power supply circuit 56 is deactivated. Thus, as the second configuration example, an explanation will be hereinafter given with regard to the configuration for latching the deactivated state of power supply circuit 56 to thereby suppress inappropriate reactivation of power supply circuit 56 and control circuit 32 when input voltage Vin becomes equal to or greater than threshold value V3 after power supply circuit 56 is deactivated while power conversion device 100 is deactivated.

Figure 5:
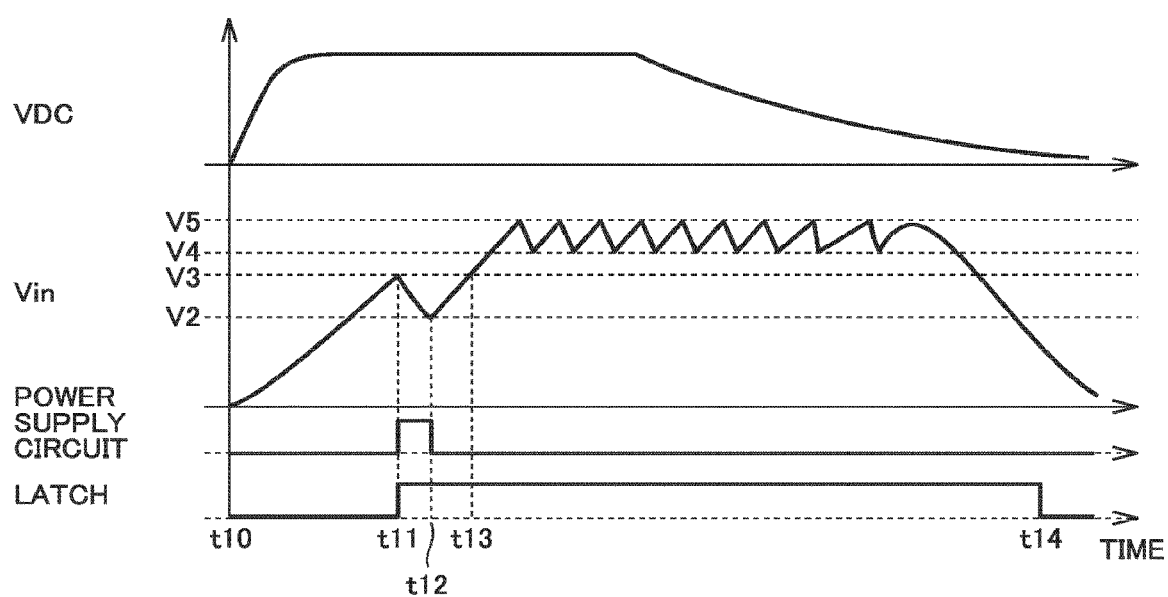
FIG. 5 is a diagram showing control of activation and deactivation of a power supply circuit by a power supply according to the second configuration example.

In the following, it is assumed that the deactivated state of power supply circuit 56 is latched so as to completely prevent reactivation of power supply circuit 56 after deactivation of power supply circuit 56. In this case, as shown in FIG. 5, when input voltage Vin decreases temporarily upon activation of power conversion device 100, input voltage Vin becomes equal to or less than threshold value V2, to thereby deactivate power supply circuit 56, with the result that a latch function is enabled. This leads to a concern that power supply circuit 56 cannot be reactivated even when input voltage Vin subsequently becomes equal to or greater than threshold value V3.

FIG. 5 is a diagram showing control of activation and deactivation of a power supply circuit 56 by a power supply 50 according to the second configuration example. Power supply 50 according to the second configuration example is obtained by adding a latch function to power supply 50 according to the first configuration example shown in FIG. 3.

Referring to FIG. 5, when power conversion device 100 is activated at time t10 and then DC voltage VDC increases, input voltage Vin also increases accordingly. When input voltage Vin becomes equal to or greater than threshold value V3 at time t11, power supply circuit 56 is activated. In the following, an explanation will be given with regard to the configuration in which, at the timing (time t11) at which power supply circuit 56 is activated, power supply circuit 56 is deactivated, and after that, the latch function for latching this deactivated state is enabled (turned on).

By activating power supply circuit 56 and control circuit 32 at time t11, the electric power of capacitor 51 is consumed, and input voltage Vin temporarily decreases. For example, when a large amount of current is consumed for activation in power supply circuit 56 and control circuit 32, input voltage Vin may become equal to or less than threshold value V2 as shown at time t12. In this case, when input voltage Vin becomes equal to or less than threshold value V2 at time t12, power supply circuit 56 is deactivated. Then, since a latch function is enabled at and after time t12, power supply circuit 56 is latched in the deactivated state. Thus, since power consumption in capacitor 51 is suppressed, input voltage Vin starts to rise.

In power conversion device 100 configured in this way, power supply circuit 56 is latched in the deactivated state even when input voltage Vin becomes equal to or greater than threshold value V3 at time t13. Thus, power supply circuit 56 is not reactivated. This consequently leads to a concern that control circuit 32 cannot be activated, so that power conversion device 100 cannot be operated.

In order to prevent the above-described situation, in the embodiment of the present invention, the third configuration example is employed in place of the above-described first and second configuration examples. In the third configuration example, after checking that input voltage Vin has sufficiently increased upon activation of power supply circuit 56 of power supply 50, the latch function for latching the deactivated state of power supply circuit 56 is enabled (turned on). Specifically, after activation of power supply circuit 56, when the number of times that input voltage Vin becomes equal to or greater than threshold value V5 becomes equal to or greater than the prescribed number of times, this latch function is turned on.

Figure 6:
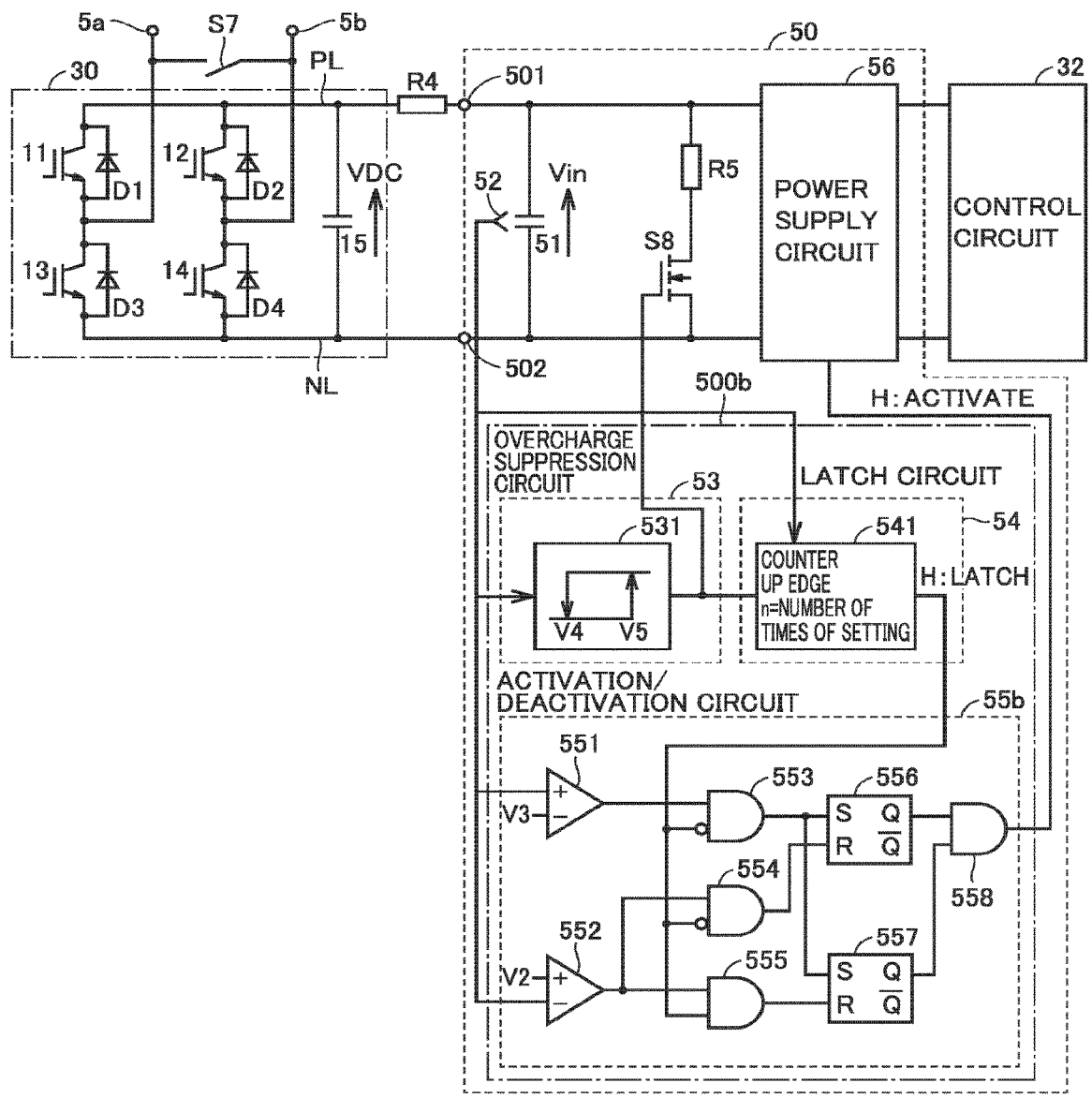
FIG. 6 is a circuit block diagram showing the configuration of a power supply according to the third configuration example.

FIG. 6 is a circuit block diagram showing the configuration of a power supply 50 according to the third configuration example. Specifically, power supply 50 according to the third configuration example shown in FIG. 6 is mainly different in configuration of a latch circuit 54 and an activation/deactivation circuit 55b in control unit 500b from power supply 50 according to the first configuration example shown in FIG. 3. Since other configurations shown in FIG. 6 are the same as those in FIG. 3, the description thereof will not be repeated.

Based on the detection value of voltage sensor 52, control unit 500b controls conduction/non-conduction of transistor S8 and activation/deactivation of power supply circuit 56. Control unit 500b includes an overcharge suppression circuit 53, a latch circuit 54, and an activation/deactivation circuit 55b.

Latch circuit 54 is configured to enable the latch function for latching power supply circuit 56 in the deactivated state based on the detection value of input voltage Vin by voltage sensor 52. Latch circuit 54 includes a counter 541. Counter 541 counts the number of times (which will be hereinafter also referred to as a "count value") that the output signal of comparison circuit 531 in overcharge suppression circuit 53 shifts from an L level to an H level.

Counter 541 is configured to output a signal at an H level to activation/deactivation circuit 55b when the count value is equal to or greater than the prescribed number of times (for example, three). On the other hand, counter 541 is configured to output a signal at an L level to activation/deactivation circuit 55b when the count value is less than the prescribed number of times. In this case, the prescribed number of times may be one, but may more preferably be two or more in order to check that input voltage Vin has reliably increased. Furthermore, the configuration of latch circuit 54 is not limited to the above, but latch circuit 54 may be configured to turn on the latch function (to enable the output signal of counter 541 from an L level to an H level) based on the number of times that input voltage Vin becomes equal to or greater than threshold value V5.

Furthermore, counter 541 is reset (that is, the count value becomes 0) when input voltage Vin becomes equal to or less than threshold value V1 in the state where the latch function is turned on. When counter 541 is reset, the output signal of counter 541 shifts from an H level to an L level. Thereby, latch circuit 54 cancels (turns off) the latch function. Threshold value V1 corresponds to the "fifth threshold value" of the present invention and satisfies the relation of V2>V1.

Activation/deactivation circuit 55b controls activation/deactivation of power supply circuit 56 based on the detection value of input voltage Vin by voltage sensor 52 and the output signal of latch circuit 54. Activation/deactivation circuit 55b includes comparison circuits 551 and 552, logic circuits 553, 554, 555, and 558, and flip-flop (hereinafter also referred to as FF) circuits 556 and 557.

Comparison circuit 551 is configured to output a signal at an H level to logic circuit 553 when input voltage Vin is equal to or greater than threshold value V3. On the other hand, comparison circuit 551 is configured to output a signal at an L level to logic circuit 553 when input voltage Vin is less than threshold value V3.

Comparison circuit 552 is configured to output a signal at an H level to logic circuits 554 and 555 when input voltage Vin is equal to or less than threshold value V2. On the other hand, comparison circuit 552 is configured to output a signal at an L level to logic circuits 554 and 555 when input voltage Vin is greater than threshold value V2.

In the case where the input from counter 541 is at an L level and also in the case where the input from comparison circuit 551 is at an H level, logic circuit 553 outputs a signal at an H level to a set input (S) terminal of each of FF circuits 556 and 557. In the case other than the above, logic circuit 553 outputs a signal at an L level to the set input (S) terminal of each of FF circuits 556 and 557.

In the case where the input from counter 541 is at an L level and in the case where the input from comparison circuit 552 is at an H level, logic circuit 554 outputs the signal at an H level to a reset input (R) terminal of FF circuit 556. In the case other than the above, logic circuit 554 outputs the signal at an L level to the reset input (R) terminal of FF circuit 556.

In the case where each of the inputs from counter 541 and comparison circuit 552 is at an H level, logic circuit 555 outputs the signal at an H level to the R terminal of FF circuit 557. In the case other than the above, logic circuit 555 outputs the signal at an L level to the R terminal of FF circuit 557.

FF circuits 556 and 557 each are constituted of an RS flip-flop circuit. FIG. 7 is a table showing the operations of FF circuits 556 and 557 shown in FIG. 6. In the following, an output Q corresponding to each of inputs S and R of each of FF circuits 556 and 557 will be described with reference to FIG. 7.

Each of FF circuits 556 and 557 is brought into a set state when the input (input S) to an S terminal and the input (input R) to an R terminal are at an H level and at an L level, respectively. In the set state, the output (output Q) of the set output (Q) terminal of each of FF circuits 556 and 557 is at an H level.

Each of FF circuits 556 and 557 is brought into a reset state when input S and input R are at an L level and at an H level, respectively. In the reset state, output Q of each of FF circuits 556 and 557 is at an L level.

Each of FF circuits 556 and 557 maintains the state of output Q when each of input S and input R is at an L level.

When a power supply is turned on, FF circuits 556 and 557 are reset and each output Q thereof is set at an L level.

In the case where output Q of each of FF circuits 556 and 557 is at an H level, logic circuit 558 outputs the signal at an H level to power supply circuit 56. In the case other than the above, logic circuit 558 outputs the signal at an L level to power supply circuit 56.

When the output of logic circuit 558 shifts from an L level to an H level, power supply circuit 56 is activated and supplies a power supply voltage to control circuit 32. Thus, control circuit 32 is activated. When the output of logic circuit 558 shifts from an H level to an L level, power supply circuit 56 is deactivated. Accordingly, the supply of a power supply voltage from power supply circuit 56 to control circuit 32 is stopped, and then, control circuit 32 is deactivated.

Then, referring to FIGS. 6 to 8, an explanation will be hereinafter given with regard to the operation of power supply 50 according to the third configuration example in each of the cases where the latch function is turned on and where the latch function is turned off.

FIG. 8(A) is a table showing the operation of power supply 50 in the case where the latch function is turned off. Referring to FIGS. 6 to 8(A), when the count value of counter 541 in latch circuit 54 is less than three, that is, when the latch function is off, counter 541 outputs the signal at an L level to logic circuits 553, 554 and 555. In this case, the output signal of comparison circuit 551 serves as an output signal of logic circuit 553, and serves as input S into each of FF circuits 556 and 557. Also in this case, the output signal of logic circuit 555, that is, input R into FF circuit 557, is fixed at an L level. Accordingly, inputs S and R of FF circuit 556 correspond to output signals of comparison circuits 551 and 552, respectively. Also, output Q of FF circuit 557 is at an H level when the output of comparison circuit 551 is at an H level, and remains the same when the output of comparison circuit 551 is at an L level.

In the case where Vin V2, the output signal of comparison circuit 551, that is, input S of each of FF circuits 556 and 557, is at an L level. On the other hand, the output signal of comparison circuit 552, that is, input R of FF circuit 556, is at an H level. Thus, output Q of each of FF circuits 556 and 557 is at an L level and serves as immediately preceding output Q of FF circuit 557, so that the output signal of logic circuit 558 is brought into an L level, and then, power supply circuit 56 is deactivated.

In the case where V2<Vin<V3, the output signal of comparison circuit 551, that is, input S of each of FF circuits 556 and 557, is at an L level. Furthermore, the output signal of comparison circuit 552, that is, input R of FF circuit 556, is also at an L level. Accordingly, outputs Q of FF circuits 556 and 557 are maintained as immediately preceding outputs Q of FF circuits 556 and 557, respectively. Thus, the output signal of logic circuit 558 is also maintained while the state of power supply circuit 56 is also maintained.

In the case where Vin≥V3, the output signal of comparison circuit 551, that is, input S of each of FF circuits 556 and 557, is at an H level. On the other hand, the output signal of comparison circuit 552, that is, input R of FF circuit 556, is at an L level. Accordingly, output Q of each of FF circuits 556 and 557 is at an H level, so that the output signal of logic circuit 558 is also brought into an H level, and thus, power supply circuit 56 is activated.

FIG. 8(B) is a table showing the operation of power supply 50 shown in FIG. 6 in the case where the latch function is turned on. Referring to FIGS. 6 to 8(B), when the count value of counter 541 in latch circuit 54 is three or more, that is, when the latch function is turned on, counter 541 outputs the signal at an H level to logic circuits 553, 554 and logic circuit 555. In this case, the output signal of logic circuit 553, that is, input S of each of FF circuits 556 and 557, is fixed at an L level. Also in this case, output signal R of logic circuit 554, that is, input R of FF circuit 556, is fixed at an L level. Accordingly, each of inputs S and R of FF circuit 556 is at an L level. In this case, when the latch function is turned on, input voltage Vin is at the level of Vin≥V3, so that an immediately preceding output Q of FF circuit 556 is at an H level. Thus, output Q of FF circuit 556 is maintained at an H level. Therefore, output Q of FF circuit 557 serves as the output signal of logic circuit 558. Also in this case, the output signal of comparison circuit 552 serves as the output signal of logic circuit 555 and serves as input R into FF circuit 557. Accordingly, the output signal of comparison circuit 558 is determined by the output signal of logic circuit 552.

In the case where V1<Vin≤V2, the output signal of comparison circuit 552, that is, input R of FF circuit 557, is at an H level. Thus, output Q of FF circuit 557, that is, the output signal of logic circuit 558, is brought into an L level. Consequently, power supply circuit 56 is deactivated.

In the case where Vin>V2, the output signal of comparison circuit 552, that is, input R of FF circuit 557, is at an L level. Thus, output Q of FF circuit 557, that is, the output signal of logic circuit 558, is maintained. Consequently, the state of power supply circuit 56 is also maintained.

In addition, in the case where Vin≤V1, the latch function is turned off as described above. Thus, in the case where the latch function is turned on, Vin is at the level of Vin>V1.

By the configuration as described above, when the latch function is turned off, activation/deactivation circuit 55 activates power supply circuit 56 each time input voltage Vin becomes equal to or greater than threshold value V3. Furthermore, activation/deactivation circuit 55 deactivates power supply circuit 56 each time input voltage Vin becomes equal to or less than threshold value V2. In contrast, when the latch function is turned on, activation/deactivation circuit 55 can maintain the state where power supply circuit 56 is activated until input voltage Vin becomes equal to or less than threshold value V2, and can deactivate power supply circuit 56 when input voltage Vin becomes equal to or less than threshold value V2, and after that, activation/deactivation circuit 55 can hold (latch) this deactivated state even when input voltage Vin increases to threshold value V3 or more.

FIG. 9 is a diagram showing control of activation and deactivation of power supply circuit 56 by power supply 50 according to the third configuration example shown in FIG. 6. In the following, the operation of power supply 50 according to the third configuration example will be described with reference to FIGS. 6 to 9.

When power conversion device 100 is activated at time t20, DC voltage VDC increases, and accordingly, input voltage Vin also increases.

Since Vin≤V2 during t20<t<t21 (time period T1) and at time t21, power supply circuit 56 is maintained in the deactivated state.

Since V2<Vin<V3 during t21<t<t22 (time period T2), power supply circuit 56 is maintained in the deactivated state.

When input voltage Vin reaches the level of Vin=V3 at time t22, power supply circuit 56 is activated.

When power supply circuit 56 is activated, input voltage Vin starts to decrease. However, since V2<Vin<V3 during t22<t<t23 (time period T3), power supply circuit 56 is maintained in the activated state.

When input voltage Vin decreases to the level of Vin=V2 at time t23, power supply circuit 56 is deactivated.

When power supply circuit 56 is deactivated, input voltage Vin starts to rise. However, since V2<Vin<V3 during t23<t<t24 (time period T4), power supply circuit 56 is maintained in the deactivated state.

When input voltage Vin reaches the level of Vin=V3 at time t24, power supply circuit 56 is again activated. After that, input voltage Vin remains at the level of Vin>V3 until time t27 at which the latch function is enabled (which will be described later in detail), that is, during t24<t<t27 (time period T5). Thus, power supply circuit 56 remains activated.

When input voltage Vin reaches the level of Vin=V5 at time t25, comparison circuit 531 of overcharge suppression circuit 53 outputs the signal at an H level to transistor S8, and thus, transistor S8 is brought into a conductive state. Accordingly, a current flows through resistance R5 and the electric power of capacitor 51 is consumed, so that input voltage Vin starts to decrease. Comparison circuit 531 outputs the signal at an H level also to counter 541. Counter 541 raises the number of times (count value), by one, that the output signal of comparison circuit 531 shifted from an L level to an H level.

When input voltage Vin decreases to the level of Vin=V4 at time t26, comparison circuit 531 of overcharge suppression circuit 53 outputs the signal at an L level to transistor S8, and then, transistor S8 is brought into a non-conductive state. Accordingly, a current does not flow through resistance R5, so that resistance R5 stops consumption of the electric power of capacitor 51. Therefore, input voltage Vin starts to increase by supply of electric power from capacitor 15.

Also after this, while power conversion device 100 is normally operated, input voltage Vin is maintained between threshold values V4 and V5 by the above-described control. Counter 541 counts the number of times (count value) that the output signal of comparison circuit 531 shifted from an L level to an H level.

When this count value becomes equal to or greater than the prescribed number of times (in this case, three) at time t27, the signal output from counter 541 to each of logic circuits 553, 554 and 555 shifts from an L level to an H level. Thereby, the latch function is enabled (turned on). During a time period from time t27 until the latch is canceled (turned off) at time t32, the output signal of counter 541 is fixed at an H level.

During a time period from when the latch function is turned on at time t27 until time t30 at which power supply circuit 56 is deactivated (described later in detail), that is, at time t27 and during t27<t<t30 (time period T6), input voltage Vin is at the level of Vin>V2. Accordingly, power supply circuit 56 is maintained at the activated state.

When power conversion device 100 is deactivated at time t28, DC voltage VDC on capacitor 15 starts to decrease.

When DC voltage VDC becomes equal to or less than prescribed threshold value V11 at time t29, then, in capacitor 51, the electric power consumed by power supply circuit 56 becomes greater than the electric power supplied from capacitor 15. Thus, input voltage Vin stops increasing but only decreases.

When input voltage Vin decreases to the level of Vin=V2 at time t30, power supply circuit 56 is deactivated. During the time period from time t30 until DC voltage VDC on capacitor 15 sufficiently decreases and the power supply from capacitor 15 to capacitor 51 sufficiently decreases, input voltage Vin shifts between threshold values V4 and V5. Then, when DC voltage VDC sufficiently decreases, input voltage Vin also stops increasing, but only decreases.

As described above, power supply circuit 56 is configured to be held in the deactivated state irrespective of input voltage Vin after power supply circuit 56 is deactivated as long as the latch function is turned on. Therefore, during the time period from time t30 until time t32 at which the latch function is canceled (described later in detail), that is, also during t30<t<t32 (time period T7), power supply circuit 56 is maintained in the deactivated state.

Since Vin=V1 at time t32, counter 541 of latch circuit 54 is reset, and the output of counter 541 shifts from an H level to an L level. In other words, the latch function is canceled (turned off). Accordingly, power supply circuit 56 can be again activated when power conversion device 100 is again activated.

Since Vin<V2 after the latch function is canceled at time t32, that is, also during t>t32 (time period T8), power supply circuit 56 remains deactivated.

Figure 10:
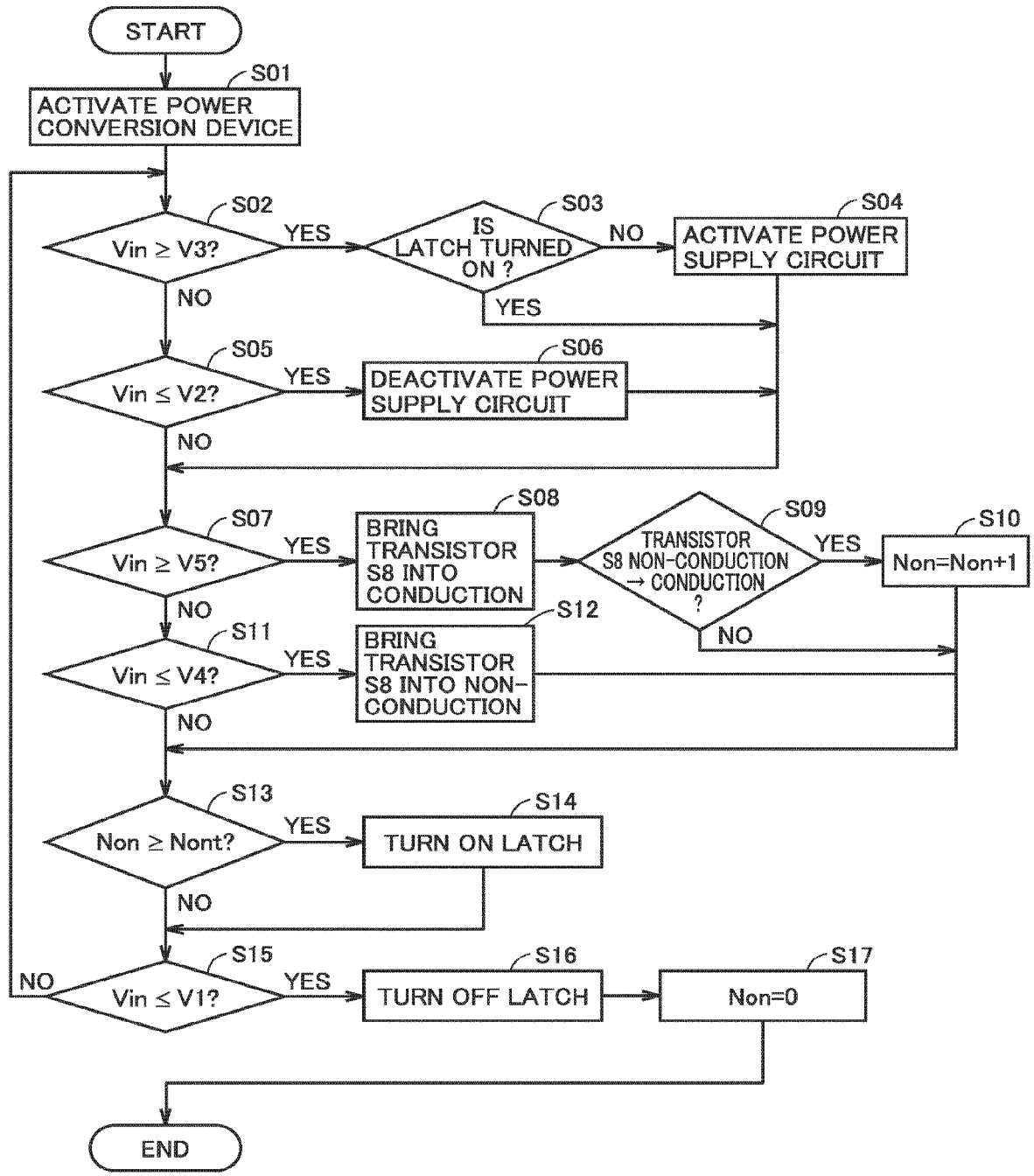
FIG. 10 is a flowchart illustrating a control process for control of activation and deactivation of the power supply circuit by the power supply shown in FIG. 6.

FIG. 10 is a flowchart illustrating a control process for control of activation and deactivation of power supply circuit 56 by power supply 50 shown in FIG. 6. The control process shown in FIG. 10 is mainly performed by control unit 500b of power supply 50.

Referring to FIG. 10, in step S01, switches S1 to S3 each are brought into a conductive state by controller 4, and power conversion device 100 is activated. In this case, a count value Non of latch circuit 54 is set at an initial value 0.

Then, in step S02, activation/deactivation circuit 55b of control unit 500b determines whether or not input voltage Vin is equal to or greater than threshold value V3. When input voltage Vin is equal to or greater than threshold value V3 in step S02 (YES in S02), the process proceeds to step S03. Then, activation/deactivation circuit 55b determines whether the latch function of power supply circuit 56 is enabled or not (whether the latch function is on or off).

When the latch function is off in step S03 (NO in step S03), activation/deactivation circuit 55*b* activates power supply circuit 56 in step S04.

On the other hand, when the latch function is on in step S03 (YES in S03), subsequent steps S04 to S06 are skipped.

When input voltage Vin is less than threshold value V3 in step S02 (NO in S02), activation/deactivation circuit 55*b* determines whether or not input voltage Vin is equal to or less than threshold value V2 in step S05. When input voltage Vin is equal to or less than threshold value V2 in step S05 (YES in S05), activation/deactivation circuit 55*b* deactivates power supply circuit 56 in step S06.

When input voltage Vin is greater than threshold value V2 in step S05 (NO in S05), step S06 is skipped.

In step S07, overcharge suppression circuit 53 of control unit 500*b* determines whether or not input voltage Vin is equal to or greater than threshold value V5. When input voltage Vin is equal to or greater than threshold value V5 in step S07 (YES in step S07), overcharge suppression circuit 53 bring transistor S8 into a conductive state in step S08. On the other hand, when input voltage Vin is less than threshold value V5 in step S07 (NO in step S07), steps S08 to S10 are skipped.

When transistor S8 is brought into a conductive state in step S08, overcharge suppression circuit 53 proceeds the process to step S09, and then, determines whether the condition that transistor S8 is brought from a non-conductive state into a conductive state is satisfied or not. In step S09, overcharge suppression circuit 53 detects the timing at which transistor S8 has shifted from a non-conductive state to a conductive state. Specifically, when input voltage Vin shifts from the level less than threshold value V5 to the level equal to or greater than V5, overcharge suppression circuit 53 determines that the above-mentioned condition is satisfied. When it is determined that the above-mentioned condition is satisfied (YES in S09), then in step S10, latch circuit 54 raises, by one, the value of the number of times (count value) Non that input voltage Vin becomes equal to or greater than threshold value V5.

On the other hand, when the condition that transistor S8 is brought from a non-conductive state into a conductive state is not satisfied in step S09, that is, when input voltage Vin is kept equal to or greater than threshold value V5 (NO in S09), step S10 is skipped. In other words, latch circuit 54 maintains count value Non.

When input voltage Vin is less than threshold value V5 in step S07 (NO in S07), then in step S11, overcharge suppression circuit 53 determines whether or not input voltage Vin is equal to or less than threshold value V4. When input voltage Vin is equal to or less than threshold value V4 in step S11 (YES in S11), overcharge suppression circuit 53 brings transistor S8 into a non-conductive state in step S12. On the other hand, when input voltage Vin is greater than threshold value V4 in step S11 (NO in S11), step S12 is skipped.

In step S13, latch circuit 54 determines whether or not count value Non is equal to or greater than a prescribed number of times Nont. When count value Non is equal to or greater than prescribed number of times Nont (YES in step S13), the process proceeds to step S14, and then, latch circuit 54 turns on the latch function.

On the other hand, when count value Non is less than the prescribed number of times Nont in step S13 (NO in S13), step S14 is skipped.

In step S15, activation/deactivation circuit 55*b* determines whether or not input voltage Vin is equal to or less than threshold value V1. When input voltage Vin is equal to or less than threshold value V1 (YES in S15), then in step S16, latch circuit 54 turns off the latch function. In subsequent step S17, counter 541 resets count value Non (Non=0), and the control process of power supply 50 ends.

On the other hand, when input voltage Vin is greater than threshold value V1 in step S15 (NO in S15), control unit 500*b* returns the process to step S02, and repeats the process in and after step S02.

As described above, according to the present embodiment, when the condition that overcharge suppression circuit 53 functions in power supply 50 is satisfied by the prescribed number of times, the latch function for maintaining the deactivated state after deactivation of power supply circuit 56 is enabled. In the configuration as described above, the latch function can be enabled after input voltage Vin into power supply 50 sufficiently increases.

By enabling the latch function after input voltage Vin sufficiently increases, it becomes possible to prevent reactivation of power supply circuit 56 from being disabled when power supply circuit 56 is deactivated due to a temporary decrease in input voltage Vin immediately after activation of power conversion device 100. Furthermore, after power conversion device 100 is deactivated, the latch function maintains power supply circuit 56 in the deactivated state. Thus, it becomes possible to suppress inappropriate reactivation of power supply circuit 56 after power conversion device 100 is deactivated. Therefore, in the power conversion device configured with a series connection of at least one or more unit converters in a main circuit power supply system, it becomes possible to prevent occurrence of a malfunction after the power conversion device is deactivated.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 1 electric power system, 1*u*, 1*v*, 1*w* power transmission line, 2, 3 transformer, 4 controller, 5 unit converter, 5*a* first terminal, 5*b* second terminal, 11 to 14 switching element, 15, 51 capacitor, 18 exciting coil, 30 main circuit, 32 control circuit, 40, 42 drive circuit, 44 switch operation circuit, 46, 52 voltage sensor, 48 I/F circuit, 50 power supply, 53 overcharge suppression circuit, 54 latch circuit, 55, 55*a*, 55*b* activation/deactivation circuit, 56 power supply circuit, 500*a*, 500*b* control unit, 501, 502 input terminal, 531, 550 to 552 comparison circuit, 553, 554, 555, 558 logic circuit, 556, 557 FF circuit, 541 counter, A1 to A3 arm, C1 to C3 current transformer, D1 to D4 diode, Iuv, Ivw, Iwu AC current, L1 to L3 reactor, NL, PL DC line, R1 to R3 current limiting resistor, R4, R5 resistance, S1 to S7 switch, S8 transistor, UL, VL, WL AC line.

The invention claimed is:
1. A power conversion device comprising:
a power converter including an arm that is configured with a series connection of at least one or more unit converters; and
a controller configured to control the power converter,
the at least one or more unit converters each including
a main circuit that includes a plurality of switching elements and a capacitor, the main circuit being configured to control the plurality of switching elements to convert a voltage across the capacitor into an AC voltage, a control circuit configured to control the plurality of switching elements according to a control signal received from the controller, and a power supply configured to step down the voltage across the capacitor to generate a power supply voltage, and supply the power supply voltage to the control circuit, the power supply including a first input terminal and a second input terminal, a voltage sensor configured to detect an input voltage supplied between the first input terminal and the second input terminal from the capacitor, a switch and a resistance that are electrically connected in series between the first input terminal and the second input terminal, a power supply circuit electrically connected between the first input terminal and the second input terminal, the power supply circuit being configured to convert the input voltage into the power supply voltage, and a control unit configured to activate the power supply circuit when the input voltage becomes equal to or greater than a first threshold value, bring the switch into a conductive state when the input voltage becomes equal to or greater than a second threshold value that is greater than the first threshold value, bring the switch into a non-conductive state when the input voltage becomes equal to or less than a third threshold value that is greater than the first threshold value and less than the second threshold value in a case where the switch is in a conductive state, and deactivate the power supply circuit when the input voltage becomes equal to or less than a fourth threshold value that is less than the first threshold value, the control unit further being configured to enable a latch function based on a number of times that the input voltage becomes equal to or greater than the second threshold value after the power supply circuit is activated, the latch function being for holding the power supply circuit in a deactivated state.

2. The power conversion device according to claim 1, wherein the control unit is configured to cancel the latch function when the input voltage becomes equal to or less than a fifth threshold value that is further less than the fourth threshold value in a case where the latch function is enabled.

3. The power conversion device according to claim 1, wherein the control unit is configured to enable the latch function when the number of times that the input voltage becomes equal to or greater than the second threshold value reaches a prescribed number of times, the prescribed number of times being equal to or greater than two.

4. The power conversion device according to claim 2, wherein the control unit is configured to enable the latch function when the number of times that the input voltage becomes equal to or greater than the second threshold value reaches a prescribed number of times, the prescribed number of times being equal to or greater than two.

\* \* \* \* \*